Dec. 31, 1940.  G. POTSTADA  2,227,364
CUTTER FOR VEGETABLES
Filed Aug. 9, 1938
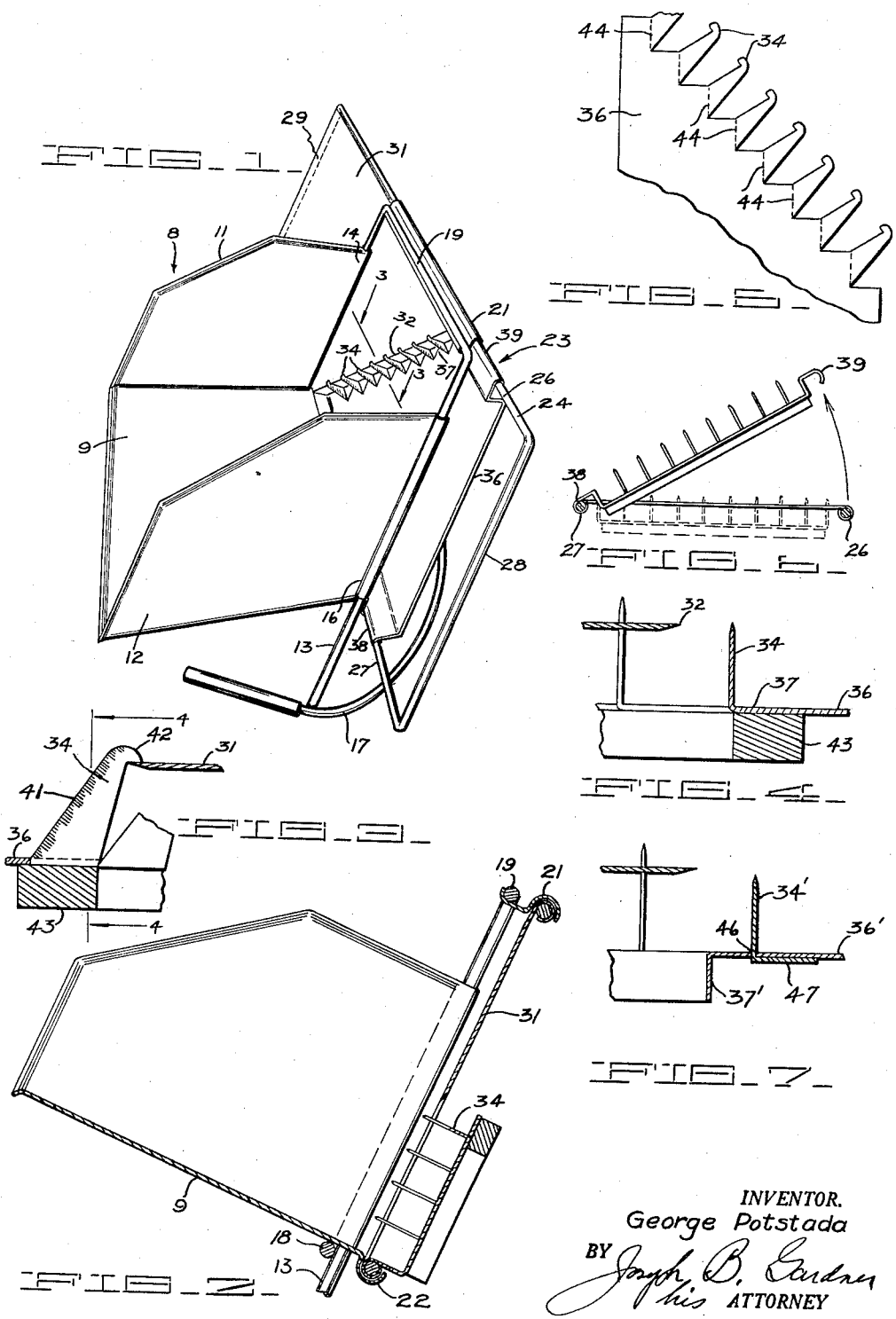
INVENTOR.
George Potstada
BY
his ATTORNEY Patented Dec. 31, 1940

2,227,364

UNITED STATES PATENT OFFICE 2,227,364

CUTTER FOR VEGETABLES

George Potstada, Oakland, Calif.

Application August 9, 1938, Serial No. 223,895

7 Claims. (Cl. 146—78)

The invention relates to a cutter for foods and vegetables and the like and more particularly to a food cutter of the type disclosed in my copending application, Serial No. 95,538, filed August 12, 1936 in relation to which the present application is a continuation-in-part.

An object of the invention is to provide a food cutter of the character described which will effect in a simple cutting operation the formation of a plurality of elongated rectangular slices of food from whole food articles placed in cooperative engagement with the cutter, and particularly to provide a plurality of elongated rectangular slices or strips of potatoes suitable for deep fat or "French" frying.

Another object of the invention is to provide a cutter of the character described in which the slices or strips of potato or other food will be formed without entailing the bending of such slices or the subjection of the slices to any other stress or strain other than that entailed by the mere slicing of the strips from the whole portion of the food.

A further object of the invention is to provide a cutter of the character described, which may be used in connection with a hopper or other suitable means for feeding the food to the cutter and which will enable the operator to feed substantially the entire whole portion of the food article to the cutter without endangering the hands of the operator, or requiring the passing of the operator's fingers into or against the cutter member.

Still another object of the invention is to provide a food cutter of the character above in which the cutter members will be rigidly supported against flexing relative to each other to provide a positive and uniform slicing of the food.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of a food cutter constructed in accordance with the present invention.

Figure 2 is a vertical sectional view of the food cutter.

Figure 3 is a fragmentary cross-sectional view of the cutter elements taken substantially on the plane of line 3—3 of Figure 1.

Figure 4 is a fragmentary cross-sectional view of the cutter elements taken substantially on the plane of line 4—4 of Figure 3.

Figure 5 is a fragmentary plan view of a blank of material from which one of the cutter members is formed.

Figure 6 is a cross-sectional view of one of the cutter members.

Figure 7 is a fragmentary cross-sectional view similar to Figure 4 but showing a modified form of construction.

The cutter of the present invention and as illustrated in the accompanying drawing comprises a food hopper 8, here shown formed of sheet metal, with a bottom 9 and upstanding side walls 11 and 12 and arranged with an open front and top and an open rear portion for receipt of food to be cut through the front and top sides for advancing towards the rear of the hopper. The hopper is supported in an elevated inclined position over a working table or the like, as illustrated in Figures 1 and 2, by means of a vertical frame 13 which is secured along the rear edges 14 and 16 of the side walls 11 and 12 and is supported in a vertically inclined position by a base member 17. A crosspiece 18 may be mounted between the upstanding sides of the frame and under the bottom 9 of the hopper to further support the hopper on the frame. Preferably, the frame, base 17 and cross member 18 are formed of wire in order to obtain a rigid light weight supporting structure. Further details of construction of the hopper and support therefor are disclosed and claimed in my Patent No. 1,994,148 issued March 12, 1935. Fastened to the upper end 19 of the frame is a guide strip 21, which is here shown in the form of an inverted channel, and a similar complementary formed guide channel is provided at the rear end 22 of the bottom 9. The guides 21 and 22 are adapted to receive a cutter member 23 which is formed for reception in the guides across the rear end of the hopper trough for cutting of food advanced thereto.

The cutter member in the present preferred construction is formed in part by an elongated substantially rectangular wire frame 24, including opposed longitudinal sides 26 and 27 and ends 28 and 29, and serves as a support for the cutter elements. Mounted across the frame adjacent the end 29 is a plate 31 which in the present construction has its edge portions rolled about the longitudinal sides 26 and 27 and the end 29 of the frame, and is terminated longitudinally to an intermediate portion of the frame, where the leading edge 32 of the plate is formed as a blade or cutting edge. Preferably, the edge 32 extends at an angle to the transverse dimension of the frame, so as to cause the edge to successively engage the food presented thereto as the cutter member is drawn across the rear opening of the hopper. The securing of the plate 31 to the frame along three sides of the plate provides a simple and extremely rugged construction for supporting the cutter edge thereto in proper relation to the frame, that is in a plane substantially parallel to the plane of the frame for desired engagement with food advanced thereto. The action of the blade 32, as will be understood, is to cut a full vertical height slice of the food pressed to the rear of the hopper.

As above explained, the present food cutter is designed primarily to cut elongated slices or rectangular prisms of potatoes for "French" frying, and to form such strips, a plurality of cutter members 34 are mounted at substantially right angles to the blade 32 so as to cut a plurality of vertically spaced strips while the blade 32 makes a full vertical cut to thereby simultaneously cut the potatoes along the three rectangularly related sides for producing an elongated rectangular prism-shaped potato strip. The cutter members 34 are here shown supported in proper relation to the blade 32 by means of a second plate 36 which is secured to the frame adjacent the end 28 thereof and which is provided with a transverse edge portion 37 adjacent to the blade 32 and which substantially parallels the inclined arrangement of the blade 32. The plate 36 is secured along its transverse sides 38 and 39 to the longitudinal sides 26 and 27 of the wire supporting frame and is connected to the frame and formed to position the transverse plane of the plate substantially parallel to but offset from the plane of plate 31 (see Figures 2 and 3). The cutter members 34 are secured to the edge portion 37 of the plate and extend therefrom normal to the plate into a position adjacent the cutter blade 32. Preferably, the leading edge 41 of the cutter members 34 (see Figure 3) is sharpened and inclined from a perpendicular to the plate 36 so as to cause successive portions of the cutter to enter the food as the cutter is drawn across the open rear side of the hopper. Thus both of the cutters 32 and 34 are presented to the food to be cut gradually with successive portions of the cutters entering the food and in this manner the slicing action of the food is greatly facilitated over that which could be obtained by presenting the full cutting faces of the cutters simultaneously to the food.

In potato slicers of the present type heretofore used, considerable difficulty has been encountered in rigidly maintaining the cutter elements in proper relation to each other. In most instances the cutter elements after some use would become slightly misaligned and subject to flexing as the cutter was advanced through the potato so as to produce uneven and broken potato slices. In the present construction, however, special precaution has been taken against this misalignment and flexing of the cutter elements so that the cutters will for a substantially indefinitely long period of use continue to cut uniform whole slices of potato. This stiffening of the cutter elements is effected in part in the present construction by securing the transverse cutter members 34 with the blade 32. As here shown, the free upstanding end portions 42 of the cutter members 34 (see Figure 3) are provided with an offset portion which is arranged to hook over the edge of the blade 32 so as to positively prevent a spreading of the plates 31 and 36 at the cutter elements. Further, the plate 36 at the edge portion 37 is secured to a transversely extending reenforcing bar 43 which rigidly supports the plate against flexing towards the plate 31.

Another disadvantage of potato cutters heretofore used has been the difficulty encountered in sharpening the cutter elements. In the present construction not only is the cutter member 23 removable as a whole from the guides and hopper so that the hopper and cutter member may be disassociated for sharpening of the cutter elements, but in addition the plate 36 is secured to the frame in a manner permitting the movement of the plate away from the plate 31 to disassociate the cutter members 34 from the cutting edge 32. This latter feature of construction is accomplished by pivotally supporting the edge portion 38 of the plate 36 to the longitudinal side 27 of the frame, as shown in Figure 6, and by detachably securing the opposite portion 39 of the plate to the longitudinal side 26 of the frame. As here shown, the edge portion 38 of the plate is rolled around the wire side 27 of the frame so as to provide a hinged support, and the opposite edge portion 39 is formed to hook around the wire side 26 of the frame. In this manner, the edge portion 39 may be unhooked from the frame and raised, as illustrated in Figure 6, so as to separate the cutter members 34 from the cutting edge 32 for sharpening and repairing of the cutter elements.

As another feature of construction of the present device, I prefer to form the cutter elements 34 integrally with the edge portion 37 of the plate 36 so that the cutter members 34 may be formed from the same blank of material as the plate 36. This is effected, as illustrated in Figure 5, by blanking out the cutter members 34 from the plate 36 and then by bending the cutter members along dotted lines 44, illustrated in Figure 5, to a position normal to the plate.

While I prefer to form the cutter members 34 integrally with the plate 36 and as a part of the same material, I may form the cutter members 34 of separate pieces and fasten them to the edge portion of the plate. Such a modified form of construction is illustrated in Figure 7, wherein the cutter members 34' are extended through a plurality of transversely spaced slotted portions 46 in the plate 36' adjacent the edge portion 37' of the plate and the cutter members 34' are provided with an offset bottom portion 47 which may be welded directly to the underside of the plate 36'. In this form of the invention I prefer to bend the edge portion 37' away from the plane of the plate, so as to form a depending flange for reenforcing the edge portion of the plate adjacent the cutters, rather than the use of a separate reenforcing bar 43, as illustrated in the preferred embodiment.

It will now be clear that as a potato or other food product is placed in the hopper and moved to the rear open side thereof, the leading edge of the potato will be moved into engagement with the plate 36 and the latter serves as a stop or guide for properly positioning the potato relative to the cutter. The operator then, while holding the potato in such position in the hopper, may grasp either end 28 and 29 of the frame and by drawing the frame forwardly, as illustrated in Figure 1, the cutter members 34 will be successively brought into engagement with the potato to slice the latter into a plurality of elongated strips, while the diagonal edge 32 of the plate will successively cut through the potato to sever from the potato the individual strips formed by the cutter members 34. Preferably, the plate 36 is spaced from the end 28 of the frame so as to leave this end of the frame open for ready engagement by the user. The end 28 thus forms an open handle portion in the cutter member. As will be noted, the diagonal arrangement of the cutter members provides for a successive engagement of the cutter members 34 with the potato and thereby obviates the initial engagement of the food article with all of the cutter members simultaneously. As a result, the cutting action on drawing the cutter across the hopper is relatively smooth and uniform throughout the entire cutting stroke with greatest cutting force adjacent the center of the stroke and decreasing towards both ends of the stroke. Also, the diagonal arrangement of the cutter blades provides for an improved slicing action on the food, which is of considerable importance in obtaining perfectly and uniformly cut rectangular prisms and in facilitating the cutting operation.

It will also be noted that by reason of the positioning of the plates 31 and 36 in spaced parallel planes, the individual strips or prisms of potato or the like which are cut by the blades are afforded a direct and straight lined passage through the cutter and at no time are the strips subjected to any bending or other stress or strain during their passage through the cutter, other than that set up immediately at the cutting surfaces of the blades themselves. Thus the elongated strips of potatoes may pass freely from the rear side of the cutter member and breaking of these strips usually encountered in other types of cutters is completely eliminated.

I claim:

1. A food cutter comprising, a food hopper having an open side, guides on said hopper adjacent opposed side edges of said side, a cutter member reciprocally mounted in said guides for movement across said side and comprising, an elongated wire frame of substantially rectangular shape, a pair of plates mounted on said frame in substantially parallel relation and spaced from each other, one of said plates being terminated intermediate the length of said frame and formed with a cutter edge thereat, and a plurality of cutter members carried by the other plate adjacent said cutter edge and mounted substantially normal to the planes of said plates and extending to said cutter edge, said cutter members being provided with offset portions at their free ends hooked over said cutter edge to prevent spreading of said plates.

2. A food cutter comprising, a food hopper having an open side, guides on said hopper adjacent opposed side edges of said side, a cutter member reciprocally mounted in said guides for movement across said side and comprising, an elongated wire frame of substantially rectangular shape, a plate mounted across said frame adjacent one end thereof and having a transversely extending cutter edge adjacent an intermediate portion of said frame, a second plate extending across said frame adjacent an opposite end thereof and having one side pivotally secured to a longitudinal side of said frame and an opposite side detachably secured to an opposite longitudinal side of said frame, said second plate being normally positioned on said frame in substantially parallel relation to but transversely spaced from said first plate and extending to a transversely spaced position from said cutter edge, and a plurality of cutter members carried by said second plate adjacent said cutter edge and extending transversely from said second plate at substantially right angles thereto to adjacent said cutter edge.

3. A food cutter comprising, a food hopper having an open side, guides on said hopper adjacent opposed side edges of said side, a cutter member reciprocally mounted in said guides for movement across said side and comprising, an elongated wire frame of substantially rectangular shape, a plate mounted across said frame adjacent one end thereof and having a transversely extending cutter edge adjacent an intermediate portion of said frame, a second plate having opposite side portions slidably engaged on the opposite longitudinal side portions of said frame for movement of said second plate to and from said cutter edge, one of said second plate side portions being pivotally secured to one of said frame sides and the opposite plate side being detachably secured to the adjacent frame side to terminate movement of said second plate into and out of a position parallel to the plane of said frame, and a plurality of cutter members carried by said second plate adjacent said cutter edge and extending at substantially right angles to said second plate to adjacent said cutter edge.

4. A food cutter comprising, a food hopper having an open side, guides on said hopper adjacent opposed side edges of said side, a cutter member reciprocally mounted in said guides for movement across said side and comprising, an elongated wire frame of substantially rectangular shape, a plate mounted across said frame adjacent one end thereof and having a transversely extending cutter edge adjacent an intermediate portion of said frame, a second plate having opposite side portions slidably engaged on the opposite longitudinal side portions of said frame for movement of said second plate to and from said cutter edge, one of said second plate side portions being pivotally secured to one of said frame sides and the opposite plate side being detachably secured to the adjacent frame side to terminate movement of said second plate into and out of a position parallel to the plane of said frame, and a plurality of cutter members carried by said second plate adjacent said cutter edge and extending at substantially right angles to said second plate to adjacent said cutter edge, said cutter members being provided with offset free end portions engaging over said cutter edge to prevent spreading of said plates.

5. A food cutter adapted for use with a hopper having an open side and arranged for reciprocal movement across said side for cutting of food advanced thereto comprising, a supporting member, a plate carried by said member and provided with a transversely extending cutter edge, a second plate carried by said member and positioned in a plane substantially parallel to but transversely spaced from said first plate and having an edge portion adjacent said cutter edge, and a plurality of cutter members formed from the stock of said second plate at said edge and being positioned at substantially right angles to said plate and extending to adjacent said cutter edge, said cutter members being provided with offset portions at their free ends engaging said cutter edge to prevent spreading of said plates.

6. A food cutter adapted for use with a hopper having an open side and arranged for reciprocal movement across said side for cutting of food advanced thereto comprising, a supporting member, a plate carried by said member and provided with a transversely extending cutter edge, a second plate carried by said member and positioned in a plane substantially parallel to but transversely spaced from said first plate and having an edge portion adjacent said cutter edge, a plurality of cutter members formed from the stock of said second plate at said edge and being positioned at substantially right angles to said plate and extending to adjacent said cutter edge, said cutter members being provided with offset portions at their free ends engaging said cutter edge to prevent spreading of said plates, and a reenforcing bar secured along said second plate edge on a side thereof opposite to said cutter members to reenforce said second plate against flexing towards said first plate.

7. A food cutter adapted for use with a hopper having an open side and arranged for reciprocal movement across said side for cutting of food advanced thereto comprising, a supporting member, a plate carried by said member and provided with a transversely extending cutter edge, a second plate carried by said member and positioned in a plane substantially parallel to but transversely spaced from said first plate and having an edge portion adjacent said cutter edge, said second plate being provided with a plurality of transversely spaced slots, and a plurality of cutter members mounted through said slots normal to said second plate and having free end portions formed to detachably engage said cutter edge to hold said plates from separation, the opposite ends of said cutter members being offset and welded to said second plate.

GEORGE POTSTADA.